Figure 1:
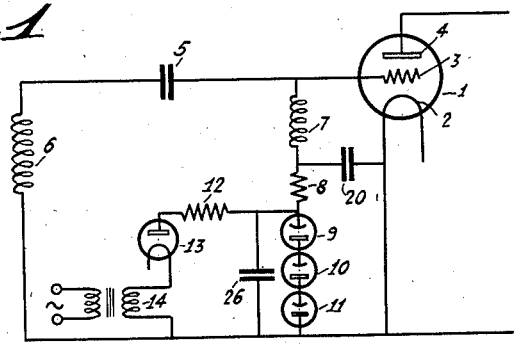

Aug. 13, 1935.  J. J. NUMANS  2,010,881

THERMIONIC GENERATOR

Filed July 12, 1928

INVENTOR
J. J. NUMANS
BY
ATTORNEY

Patented Aug. 13, 1935

2,010,881

UNITED STATES PATENT OFFICE 2,010,881

THERMIONIC GENERATOR

Johannes Jacques Numans, Hilversum, Netherlands, assignor to Radio Corporation of America, New York, N. Y.

Application July 12, 1928, Serial No. 292,040
In the Netherlands February 23, 1928

6 Claims. (Cl. 250—36)

This invention relates to high power thermionic generators and amplifiers which are adapted for the generation of high frequency oscillations. In using apparatus of this type it is customary to maintain the control grid at a sufficiently high negative potential under all conditions as otherwise the emission from the cathode might reach undesired high values.

In three element vacuum tube oscillation generators which employ grid electrodes it is customary to connect a grid leak of a predetermined resistance thereto in order to permit the passage of grid currents for automatically maintaining the potential on the grid electrode negative. A circuit arrangement is usually employed whereby the required negative bias is provided even when the oscillation generator is not functioning as such, that is, when oscillations are not being generated.

Heretofore, this has been accomplished by using a galvanic battery which may consist of dry cells or storage batteries in the grid leak circuit. This method, however, has been found to be both expensive and complicated when the battery is required to supply high voltages due to the number of cells required. A further disadvantage is that the battery is adversely affected by the grid currents flowing in the circuit as oscillations are generated.

It is an object of the present invention to provide an improved arrangement and method of operation whereby the above-mentioned difficulties are overcome in a simple and efficient manner.

Briefly, this invention comprises the use of one or more electron discharge devices in the grid leak circuit of an oscillation generator with a source of electro-motive force connected in parallel with these devices. The threshold value or the value at which the electron discharge device is designed to function is arranged to be at least equal to the required minimal negative grid voltage of the generator valve, and the source of electro-motive force is arranged to have a value which is at least equal to said threshold value. In this arrangement, when the generator is not actually in an oscillating state the resistance of the discharge device or devices is practically infinite, and at such time the source of electromotive force connected in parallel with said device or devices furnishes no current. However, when the generator does oscillate the threshold voltage of the discharge device at certain periods is surpassed, with a consequent flow of grid current through the device and a reduction of the resistance of the device to their comparatively small internal working resistance. It has been found that the negative grid bias of the oscillator generator can be effectively controlled by connecting more or less ohmic resistance in series with these devices.

According to the present invention it is proposed, when high power generators are employed which use heavy grid currents, to include in the grid leak circuit two or more parallel groups of glow discharge devices, each of said groups comprising one or more devices connected in series with a resistance.

According to the present invention it is also proposed, when retroactively coupled valve generators are employed, to connect in the grid leak circuit one or more triodes, the grids of which are sufficiently biased.

Figure 2:
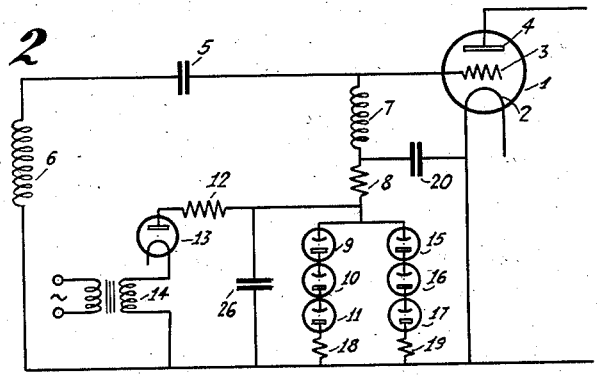
Figure 3:
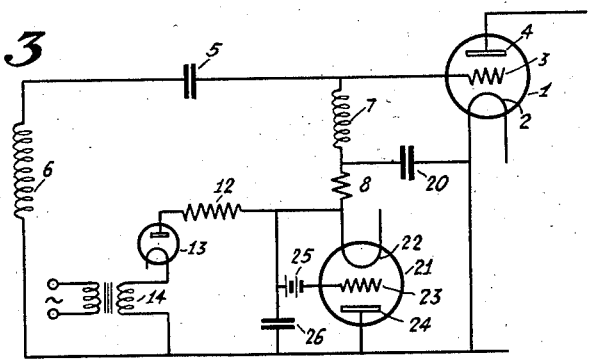

A better understanding of the present invention may be had by referring to the following detailed description taken in conjunction with the accompanying drawing wherein Figures 1 and 2 illustrate diagrammatically tube oscillation generator circuits suitable for use with external excitation, i. e., by control of a master oscillator; and Figures 3 illustrates diagrammatically a tube oscillation generator circuit adapted for self-excitation.

Referring to Figure 1, a generator valve is constituted by a triode 1 which contains a cathode 2, a grid 3 and an anode 4. The grid circuit comprises a grid condenser 5 and a coil 6 which is assumed to be coupled with the plate circuit (not represented) of the control valve or of an intermediate amplifier.

The grid leak consists of a high-frequency choking coil 7 connected in series with an ohmic resistance 8 and with three glow-discharge lamps 9, 10 and 11. In parallel with these three lamps is located a circuit consisting of a high ohmic resistance 12, a rectifier 13 and the secondary winding of a transformer 14 whose primary winding is fed by any suitable source of current, for example, by the local mains. The device 13, 14 may also be replaced by a battery since the latter never has to supply current of an appreciable value.

The installation functions as follows:

When the valve 1 is excited, the grid 3 is negatively charged until the breakdown voltage of the glow-discharge lamps 9, 10 and 11 is reached whereupon the grid charge is dissipated across the choking coil 7, the resistance 8 and the lamps 9, 10 and 11. The average negative grid potential is further determined in that case by the product of the grid current and the resistance 8 increased with the total working voltage of the lamps 9, 10 and 11.

When the oscillations die away, the negative charge of the grid 3 would entirely disappear, and, if no precautions were taken rapid deterioration of valve 1 would ensue. Now, however, the rectifier 13 begins to function, the positive pole of the said rectifier being connected across the transformer winding 14 to the filament 2, whereas its negative pole is connected across the resistances 12 and 8 and the choking coil 7 to the grid 3.

The tension furnished by the rectifier is so chosen as to lie in the neighbourhood of and at any rate not far above the breakdown voltage of the lamps 9, 10 and 11. Besides, the high resistance 12 prevents discharge currents of appreciable value from flowing from the rectifier through these three lamps. Since consequently this rectifier has to supply substantially no current, its dimensions as well as those of the transformer 14 may be small so that the installation is cheap. Moreover, this single rectifier is capable of providing all the stages of the preceding intermediate amplifier, if used, with negative grid biases.

The resistance 12 may also be replaced by a choking coil having a high ohmic resistance, the ends of the said coil being connected across smoothing condensers to the lower end of the transformer winding 14. When a resistance 12 is used it is also advisable to put in the circuit a smoothing condenser 26.

The value of the grid current produced during the generation of oscillations may be such that it would be desirable to insert one or more similar series of devices in parallel with glow discharge devices 9, 10 and 11. In that case however, an ohmic resistance has to be provided in each of the said parallel branches as otherwise only in one of the said branches a break-down would be produced.

This circuit-arrangement is represented in Figure 2 which is quite similar to Figure 1, it being noted that in parallel with the branch which comprises the glow-discharge lamps 9, 10 and 11, is connected a second series of glow-discharge lamps 15, 16 and 17, in the two series being connected respectively an ohmic resistance 18 and a resistance 19. The operation remains the same as that described with reference to Figure 1.

Figure 3 finally shows a circuit-arrangement for retroactively coupled generator valves. This circuit-arrangement is quite similar to that of Figure 1 but differs therefrom in that the glow-discharge lamps 9, 10 and 11 are replaced by a triode 21 comprising an incandescent cathode 22, a grid 23 and an anode 24, the grid 23 being biased, by means of a battery 25, to a point where the valve is just rendered non-conductive or "cut off" at a tension whose absolute value is equal to the minimal negative generator grid voltage to be maintained.

What I claim is:

1. In electrical apparatus of the character described, an electron discharge device having an anode, a cathode and a grid, the series combination of a choke coil a resistance and a glow discharge device connected between said cathode and said grid, a condenser connecting said choke coil and said cathode, a condenser paralleling the glow discharge device in said series combination, a rectifier, a resistance in series with said rectifier, said series combination of resistance and rectifier being connected in parallel with the parallel combination of the condenser and glow discharge device, the threshold value of said glow discharge device being at least equal to the required minimal negative grid voltage of said electron discharge device, and the voltage produced by said rectifier having a value at least equal to the required minimal negative grid voltage.

2. In electrical apparatus of the character described, an electron discharge device having an anode, a cathode, and a grid, a choke coil serially connected with a condenser, both said coil and condenser being connected across said grid and cathode, a circuit in shunt of said condenser, said circuit comprising a plurality of series coupled glow discharge devices serially connected to a resistance, said resistance having one of its terminals connected to the series coupled glow discharge devices and the other terminal connected to the junction point between said choke coil and condenser, and a source of electromotive force connected in parallel through a second resistance to said plurality of series coupled glow discharge devices, said second resistance being directly connected to that side of said series coupled glow devices which is connected to said first resistance, said source of electromotive force producing a voltage whose value is substantially equal to the value of the threshold voltage of said glow discharge devices.

3. In an oscillation generator, a thermionic tube comprising cathode, anode and control electrodes, a choke coil in series with a condenser coupled to said cathode and control electrodes, a plurality of serially connected electron discharge devices, said devices being connected in parallel with a source of electro-motive force, said parallel combination of devices and source being connected through a resistance in parallel across said condenser.

4. A thermionic tube comprising cathode, anode and control electrodes, an input circuit comprising two reactances of opposite signs connected in series to each other coupled to said cathode and control electrodes, a plurality of parallel paths, each containing an impedance in series with an electron discharge device, said plurality of paths being connected in parallel with a source of electro-motive force, said whole parallel combination of electron discharge devices and source being, in turn, connected in parallel across one of said reactances in said input circuit.

5. A thermionic tube comprising cathode, anode, and control electrodes, an input circuit comprising two reactances of opposite signs connected in series and directly connected between said cathode and control electrodes, an electron discharge device connected in parallel with a source of electromotive force, said parallel combination of device and source being conductively connected through a resistance in parallel across only one of said reactances in said input circuit, the value of the potential at which said device passes current being at least equal to the required minimal negative grid voltage of said tube, said source of electromotive force producing a voltage whose value is at least equal to the value of the potential at which said device passes current.

6. A thermionic tube generator comprising cathode, anode, and control electrodes, and a grid leak, said grid leak containing a glow discharge tube for discharging the negative charges after they exceed the required minimal negative grid voltage of the generator tube, the threshold value of said glow discharge tube being at least equal to said required minimal negative grid voltage, and a constant source of potential in parallel to said discharge tube whose value is at least equal to the said threshold value.

JOHANNES JACQUES NUMANS.